United States Patent
Tchoumou et al.

(10) Patent No.: US 10,679,354 B2
(45) Date of Patent: Jun. 9, 2020

(54) METHOD FOR THE GRAPHICS PROCESSING OF IMAGES

(71) Applicant: LAOVILAND EXPERIENCE, Juvignac (FR)

(72) Inventors: Jean-Thierry Tchoumou, Juvignac (FR); Pascal Tchoumou, Juvignac (FR); Matthias Rodriguez-Torrecillas, Perols (FR); Boris Jaulmes, Beziers (FR)

(73) Assignee: Laoviland Experience, Juvignac (FR)

( * ) Notice: Subject to any disclaimer, the term of this patent is extended or adjusted under 35 U.S.C. 154(b) by 198 days.

(21) Appl. No.: 16/068,114

(22) PCT Filed: Dec. 30, 2016

(86) PCT No.: PCT/FR2016/000217
§ 371 (c)(1),
(2) Date: Jul. 4, 2018

(87) PCT Pub. No.: WO2017/118782
PCT Pub. Date: Jul. 13, 2017

(65) Prior Publication Data
US 2019/0012791 A1    Jan. 10, 2019

(30) Foreign Application Priority Data
Jan. 4, 2016   (FR) ...................................... 16 50004

(51) Int. Cl.
*G06K 9/34*     (2006.01)
*G06T 7/194*    (2017.01)
(Continued)

(52) U.S. Cl.
CPC .............. *G06T 7/194* (2017.01); *G06F 16/56* (2019.01); *G06F 17/11* (2013.01); *G06K 9/38* (2013.01);
(Continued)

(58) Field of Classification Search
CPC .. G06K 9/4671; G06K 9/3208; G06T 3/0012; G06T 7/136; G06T 7/11;
(Continued)

(56) References Cited

U.S. PATENT DOCUMENTS 8,718,333 B2 *  5/2014  Wolf ........................ G06K 9/42
                                                    382/115
9,148,652 B2 *  9/2015  Kim ........................ G11B 27/28
(Continued)

OTHER PUBLICATIONS

Radhakrishna Achanta, et al "Salient Region Detection and Segmentation", Computer Vision Systems; [Lecture Notes in Computer Science], 20080512 Springer Berlin Heidelberg, Berlin, Heidelberg; vol. 5008,pp. 66-75, Publication info: XP019088821.
(Continued)

*Primary Examiner* — Charlotte M Baker
(74) *Attorney, Agent, or Firm* — Craft Chu PLLC; Andrew W. Chu

(57) ABSTRACT

A method for graphic image processing from existing source image files forming a database from which an image is extracted for said graphic processing operations. The method includes the step of implementing n (n≥1) saliency processing operations in order to form n saliency cards CSi, with i=1 to n;

performing a linear combination $$\frac{\nabla_{i=1}^{N} Ai.SCi}{\sum_{i=1}^{n} Ai}$$

in order to obtain a single resulting saliency card;
performing a first thresholding on the resulting saliency card; and
vectorizing said thresholded card.

11 Claims, 1 Drawing Sheet

(51) Int. Cl.
*G06T 11/00* (2006.01)
*G06K 9/46* (2006.01)
*G06T 7/10* (2017.01)
*G06K 9/38* (2006.01)
*G06T 7/136* (2017.01)
*G06T 7/90* (2017.01)
*G06F 16/56* (2019.01)
*G06F 17/11* (2006.01)

(52) U.S. Cl.
CPC .............. *G06K 9/4671* (2013.01); *G06T 7/10* (2017.01); *G06T 7/136* (2017.01); *G06T 7/90* (2017.01); *G06T 11/001* (2013.01)

(58) Field of Classification Search
CPC ........... G06T 2207/10024; G06T 7/194; A61B 3/102; G01B 9/02091
USPC .......................... 382/173, 115, 278, 107, 118
See application file for complete search history.

(56) References Cited

U.S. PATENT DOCUMENTS 9,699,371 B1* 7/2017 Eslami ...................... G06K 9/32
10,198,654 B2* 2/2019 Wang ................... G06K 9/4604
2011/0229025 A1 9/2011 Zhao

OTHER PUBLICATIONS

Vidya Setlur, et al "Automatic Stained Glass Rendering", Advances in Computer Graphics Lecture Notes in Computer Science; LNCS, Jan. 1, 2006 Springer, Berlin, DE, vol. 4035,pp. 682-691, Publication info: XP019041388.

Wu Zhipeng, et al "Saliency Detection-Based Mixture of Reality and Non-Photorealistic Rendering Effects for Artistic Visualization", Medical image computing and computer-assisted intervention—MICCAI 2015 : 18th international conference, Munich, Germany, Oct. 5-9, 2015; proceedings; [Lecture Notes in Computer Science; Lect.Notes Computer], Dec. 13, 2013 Springer International Publishing, vol. 8294 Chap.63,pp. 678-689, Publication info: XP047267990.

Jan Eric Kyprianidis, et al "State of the Art: A Taxonomy of Artistic Stylization Techniques for Images and Video", IEEE Transactions on Visualization and Computer Graphics, May 1, 2013 IEEE Service Center, Los Alamitos, CA, US, vol. 19,Nr:5,pp. 866-885, Publication info: XP011497433.

* cited by examiner

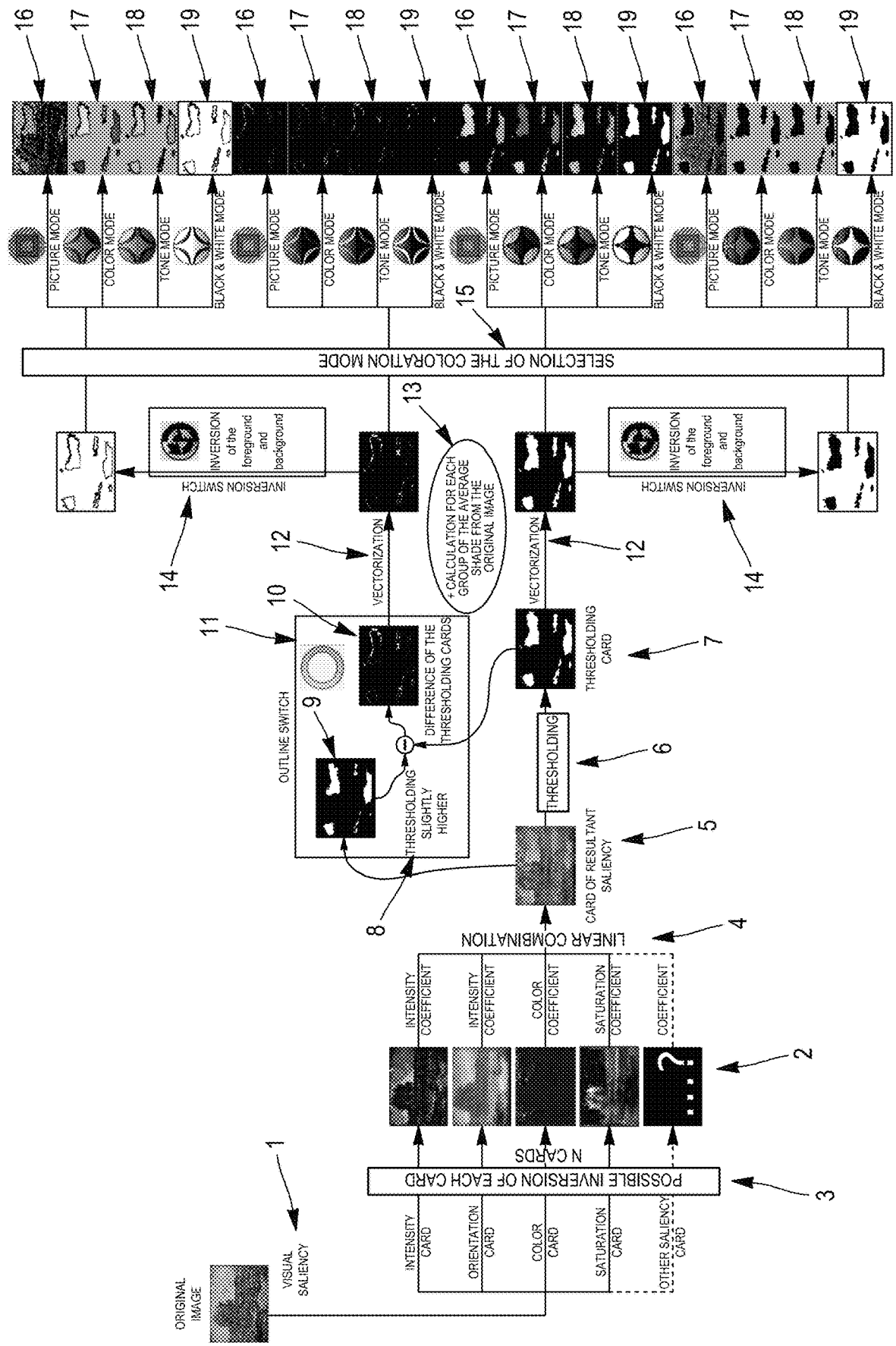

METHOD FOR THE GRAPHICS PROCESSING OF IMAGES

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a method for automated graphic image processing permitting to boost and/or to facilitate the inspiration of graphic representation creators from a few input points. The idea is to extract graphic material from existing images, in various forms and for various automated processing operations, in order to accompany an unstructured imaginative process. The process leads to amplifying, through technical processing means, the artistic and personal contribution of a person.

2. Description of Related Art Including Information Disclosed Under 37 CFR 1.97 and 37 CFR 1.98

This graphic material from which is built using automated means a visual atmosphere stimulating the creator's imagination is derived from source image files stored in the memory of an electronic data processing system.

Particular elements can be extracted therefrom by various automated processing operations in order to provide the user with a work base that can easily be modelled. In other words, a source image file is provided by the system in order to be processed, providing the basis for a graphic process integrating virtual objects that can be recombined and infinitely modified by computer processing according to the inspiration of the user, who is accompanied by this processing in order to create new graphic representations reflecting his own creativity.

In reality, technical computer processing operations applied to the source image permit to transform it stepwise, user accesses permitting to graduate or influence the nature and amplitude of the implemented graphic processing operations with graphical vocation, which processing operations are also largely automated.

BRIEF SUMMARY OF THE INVENTION

The method according to the invention, which thus permits graphic image processing operations from existing source image files, which constitute in practice a database from which an image is extracted for said graphic processing operations, is such that it includes the following steps:
implementing n (n≥1) visual saliency processing operations on a selected source image file, based on n predetermined saliency criteria, in order to form n saliency cards CSi, where i=1 to n;
performing a linear combination $$\frac{\nabla_{i=1}^{N} Ai.SCi}{\sum_{i=1}^{n} Ai}$$

in order to obtain a single resulting saliency card, the saliency coefficients Ai being real variables varying between 0 and 1;
performing a first thresholding on the resulting saliency card, generating a binary thresholded card creating white and black saliency spots depending on whether they are respectively above and below a threshold value;
vectorizing said thresholded card generating an individualization of the spots;
assigning white spots to a set defined as the foreground, each spot being defined as a group;
determining the average of the hues of the pixels of each area of the source image corresponding to a group and storing in the memory this average hue for each group;
filling the groups with a solid color or a texture.

The saliency coefficients Ai are those, which permit in practice to characterize the visual identity of the image, by graduation of each saliency criterion, i.e. in fact of each optical parameter to which the saliency processing relates: these are for example the intensity, the orientation, the colors, the saturation, etc.

The first saliency step therefore aims at representing the salient points of an image according to different criteria, by identifying and isolating in essence the areas that would naturally catch the human eye.

In other words, it is a matter of stalling on stimulations, which the brain and more precisely the human nervous system are more naturally receptive to, and of simulating them as faithfully as possible by automated processing. According to the invention, the automation has mainly focused on salience factors that attract human sensory attention in a very instinctive way, such as the color contrast, the size of the objects or also their brightness. The factors that mobilize deeper processes, for example related to the observer's history and his experience, are not or little used in the invention.

The information, in the first step of the method of the invention, is in essence divided into several information "cards", hereinafter referred to as the saliency cards, each focusing on a processing based on a parameter such as those mentioned above: color, saturation, intensity, orientations of the image. Actually, several data cards are obtained from the single source image, isolating each of the information representative of a filtering focused on one of the mentioned parameters or criteria. The constitution of the saliency cards therefore consists in extracting different types of useful information for the continuation of the method, in the way of the components of a vector.

This decomposition according to a predetermined basis of criteria is followed, in a second step, by a merging of the information obeying a particular logic in order to obtain a final saliency card, i.e. a data card, in which the information resulting from the basic saliency processing operations are grouped together. In the present case, this is more specifically a linear combination that in some way performs a weighted average over the n saliency coefficients Ai, whereby the latter may obviously be modified in order to change the electronic processing. The capacity of changing of the saliency coefficients Ai is aimed at involving more or less and distinctly the different optical criteria used for the saliency processing. In fact, said saliency coefficients Ai, which are, as mentioned, real variables varying between 0 and 1, reflect the relative importance of each saliency criterion in the resultant saliency card. It is well understood that their modulation permits unlimited variation of the graphical results obtained at the end of the saliency processing.

The step then performing a first thresholding, also resulting into a card, i.e. into a set of information, produces in this case a binarized image, i.e. it leads to a binarized image, with areas exclusively of two colors, white or black. It can be considered that it is a culmination of the saliency process, which highlights the areas retained (white) with respect to a background, the criterion of representation of which is inverted (black).

The resulting vectorization, in the method of the invention, leads to differentiate the various white areas of saliency, referred to as groups, in order to assign them to a "layer" of work corresponding to the foreground, which is distinct from the background, which therefore constitutes the background. From this stage on, the work on the creative visual material becomes exclusively vectorial.

During this vectorization step, the different groups are labeled to be indexed in order to provide them with a unique identity so as to process them, according to the automated routines of the method of the invention, in an individualized way. This indexing will be explained in more detail below.

The threshold constituting the thresholding parameter used in the eponymous step is a variable, which can be selected by the user, who sets a suitable value for same from which the entire processing is performed.

Also at this stage is performed, for each group in the foreground, the calculation of the mean value of the hue corresponding to same based on the fraction of the original image of the source file filling a spot of a same shape, a same surface area and a same location as this group. In other words, this calculation is performed from an image portion delimited in the source image by the contour of the spot constituting the group, by taking the hue of each pixel of this image fraction and by finally averaging the hues of all the pixels of said image fraction. This hue average is stored in the memory by the system, for use in an eventual subsequent processing phase.

In a next step, according to the method of the present invention, the white areas or groups are filled during a colorization or texturing process.

The original image, or source image, from which we start and on which is performed the automated processing specific to the method of the invention, is finally transformed so that the result is visually completely different from the initial visual aspect, following the processing steps being implemented and discussed above. The set offers a powerful assistance to the inspiration by providing creative and original graphic solutions through successive and modular automated computer processing operations.

The method of the invention permits in fact multiple adaptations and variants widening its field of possibilities: in particular, at least one criterion of saliency underlying a saliency processing can be reversed in the first step. This leads to inverting the results obtained by the saliency processing involved.

Furthermore, the threshold set for the first thresholding can vary, which leads to an infinity of possible visual results.

According to one possibility, another step can be implemented during the method, either after or in parallel with the first thresholding, in the form of a second thresholding the threshold value of which is chosen at a level very close to the threshold selected for the first thresholding, for which it should be noted that it may be slightly higher or slightly lower. A differentiation of the white pixels resulting from the two thresholding operations then leads to identifying a set of peripheral pixels permitting to determine the contour of the white spots resulting from the first thresholding.

According to yet another possibility covered by the method of the invention, at the end of the preceding vectorization phase, an additional step consisting of a color inversion of the black and white spots can be implemented. This is in fact a reversal of the foreground and the background. As a variant, the black background can also be removed and remain transparent.

The step of filling each group is performed, according to the invention, by selecting a plurality of modes including at least an image mode, a color mode, a hue mode and a black and white mode. However, this is by no means a restrictive list in the meaning of the invention, the step technically consisting essentially of a filling, whereby the filling mode can obviously be different from those mentioned by way of examples.

In particular, the image mode consists in filling a given group with the image fraction from the source file that has the same shape, the same surface area as the group and corresponds to the location of this group in the source image. The color mode can, in turn, consist in filling a given group with a solid color determined by a random process conducted by the system. The hue mode can, in turn, be performed by filling a given group with the average hue stored for this group, and finally the black and white mode can consist in filling a given group with white.

BRIEF DESCRIPTION OF THE SEVERAL VIEWS OF THE DRAWINGS

The invention will now be described in more detail with reference to the attached FIGURE, which very schematically represents an example of a tree structure of the different main and secondary steps that can be implemented by the method of the invention.

DETAILED DESCRIPTION OF THE INVENTION

With reference to this FIG. 1, the original image (1) appearing on the left-hand side of the FIGURE is first submitted to several parallel visual saliency processing operations focused on distinct saliency criteria and resulting into different cards (2). These cards (2) are groupings of individualized post-processing information. In the example shown in FIG. 1, the criteria of salience retained are the intensity, the orientations, the colors, the saturation, but these are only possible examples as illustrated by the saliency card placed at the bottom left, the criterion of which is not assigned. It should be noted that all these criteria of salience can be reversed in (3), resulting into what is referred to as inversion of the cards (2), implemented individually, if necessary, for each saliency processing performed in parallel.

According to a subsequent calculation step, a linear combination (4) results into a single saliency card (5), which is in fact the result of the linear combination of the processing operations performed for each card (2). It is actually an average of the criteria of salience weighted by the coefficients of saliency Ai assigned to each one of these criteria. This saliency card is a set of data that reflects the various calculations of saliency by criteria and the weights given to said criteria.

This set of data is subjected to a first thresholding processing (6) resulting into a first thresholded card (7), the thresholding operation being in this case performed according to a first threshold. The result is a binarization of the image giving rise to areas of only two hues, black and white.

The white spots correspond in practice to the areas that are above the first threshold, and are filled with white after the "filtering" processing said thresholding represents. The first threshold is in this case varying, the variation of this parameter being accessible to the user. The black background corresponds to the parts that are below said first threshold, and constitute in practice the background of the thresholded image.

At the same time, a second thresholding (8) dependent on a slightly different, in this case slightly higher, threshold is implemented, giving a second thresholded card (9), the white spots of which are a little smaller because of the very small increase of the threshold. A difference between the two thresholded cards (7, 9) results into a contour card (10), since the result of said difference is then analyzed in an outer contour of the spots the surface areas of which are the smallest (those from the first lower threshold). The difference operation is performed in what is referred to as a contour switch (11), which is not always actuated, but constitutes an option of the system.

At the exit of the thresholding operations, a vectorization (12) is implemented, which permits the formation of the groups by individualization of the spots in the thresholded images. An implementation indexing of the individualization of the areas is performed by a double scanning, which provides a label or which labels each pixel and assembles it with a group being formed. This double scanning is performed as follows: The pixels or elements of the image are scanned by columns, then by rows during a first scanning. If the pixel or element being examined does not belong to the background, its neighbors located directly above and directly to the left are examined and, if they belong to the background, a new identification label is created. Otherwise, the smallest label of the neighboring ones is taken and assigned to this newly identified pixel. This assignment, and the equivalence between the two neighboring labels, is recorded. During the second passage, the rows and columns are scanned again, and if a pixel or item being examined does not belong to the background, it is reassigned a label by taking the smallest equivalent label. All the subsequent processing operations become vectorial, starting from this step. For each group, a calculation (13) is performed by the system, in order to determine the hue of the group by determining the average of the hues of the pixels of the equivalent (shape, surface area and location) of the group in the source image. Said hue is stored in memory by the system.

A reversal switch (14) may be actuated at this stage, i.e. after the vectorization obtained in step (12). It causes the inversion of the foreground and the background, both for the image of the contours if a contouring has been implemented through the contour switch (11) (see at the top of the FIGURE) and for that of the groups showing the spots in the absence of such a contouring (see the bottom of the FIGURE).

In the absence of inversion, but also if it takes place, the next step of the method consists in filling (15) the spots or groups of the image, by selecting one of a plurality of filling modes. By way of an example, we will cite an image mode (16), a color mode (17), a hue mode (18) and a black and white mode (19), without this being exhaustive.

The image mode (16) consists of filling a group with a well-defined portion of image and has only one possible origin: it is in practice derived from the source file and has the same shape, the same surface area as the group and the location of which in the source image matches the location of the group in the image being processed.

The color mode (17) uses a solid color, determined by a random process within the framework of the method of the invention, to fill a given group.

The hue mode (18) proceeds to filling a group by the average hue stored for that group, as indicated above.

Finally, the black and white mode (19) very simply consists in filling a given group with white.

The invention is of course not limited to the examples described and explained with reference to the figures, but encompasses the variants and versions, which fall within the scope of the claims.

We claim:

1. A method for graphically processing images from existing source image files forming a database from which an image is extracted for said graphic processing operations, the method comprising the following steps:
   implementing n (n≥1) visual saliency processing operations on a selected source image file, based on n predetermined saliency criteria, in order to form n saliency cards CSi, where i=1 to n;
   performing a linear combination $$\frac{\nabla_{i=1}^{N} Ai.SCi}{\sum_{i=1}^{n} Ai}$$

in order to obtain a single resulting saliency card, the saliency coefficients Ai being real variables varying between 0 and 1;
   performing a first thresholding on the resulting saliency card, generating a binary thresholded card creating white and black saliency spots depending on whether they are respectively above and below a threshold value;
   vectorizing said thresholded card generating an individualization of the spots;
   assigning white spots to a set defined as the foreground, each spot being defined as a group;
   determining the average of the hues of the pixels of each area of the source image corresponding to a group and storing in the memory this average hue for each group; and
   filling the groups with a solid color or a texture.

2. The method for graphic image processing according to claim 1, wherein at least one saliency criterion underlying a saliency processing is inverted.

3. The method for graphic image processing according to claim 1, wherein the threshold set for the first thresholding is varying.

4. The method for graphical image processing according to claim 1, wherein a second thresholding is performed, the threshold of which is at a level close to the threshold selected for the first thresholding, a differentiation of the white pixels resulting from the two thresholds leading to a set of pixels permitting the calculation of a contouring of the white spots resulting from the first thresholding.

5. The method for graphic image processing according to claim 1, wherein at the end of the vectorization phase, a color inversion of the black and white spots is implemented.

6. The method for graphic image processing according to claim 1, wherein at the end of the vectorization phase, the black background is removed and remains transparent.

7. The method for graphic image processing according to claim 1, wherein the filling of each group is performed by selecting a plurality of modes including at least an image mode, a color mode, a hue mode and a black and white mode.

8. The method for graphic image processing according to claim 7, wherein the image mode consists in comprises filling a given group by the image portion resulting from the source file, which has the same shape, the same surface area as the group and corresponds to the location of this group in the source image.

9. The method for graphic image processing according to claim 7, wherein the color mode comprises filling a given group with a solid color determined by a random process.

10. The method for graphic image processing according to claim 7, wherein the hue mode comprises filling a given group with the average hue stores in memory for this group.

11. The method for graphic image processing according to claim 7, wherein the black and white mode comprises filling a given group with white.

\* \* \* \* \*